United States Patent [19]

Callander

[11] Patent Number: 5,026,744

[45] Date of Patent: Jun. 25, 1991

[54] SYNTHETIC CLAY

[75] Inventor: Keith A. Callander, Sarnia, Canada

[73] Assignee: Polysar Limited, Sarnia, Canada

[21] Appl. No.: 297,336

[22] Filed: Jan. 17, 1989

[51] Int. Cl.$^5$ .................... C08K 5/10; C08K 3/26; C08K 3/34; C08L 91/08

[52] U.S. Cl. ....................... 524/27; 524/35; 524/62; 524/286; 524/425; 524/451; 524/492

[58] Field of Search ............. 524/35, 62, 286, 425, 524/451, 492, 27

[56] References Cited

U.S. PATENT DOCUMENTS

| | | | |
|---|---|---|---|
| 1,815,998 | 7/1931 | Witherspoon et al. | 524/32 |
| 3,463,755 | 8/1969 | Forrester et al. | 524/574 |
| 3,500,603 | 3/1970 | Strack | 52/397 |
| 3,896,245 | 7/1975 | Seto et al. | 428/31 |
| 3,945,975 | 3/1976 | Strack | 524/526 |
| 4,440,829 | 3/1984 | Cerace et al. | 428/31 |

FOREIGN PATENT DOCUMENTS 1312815  4/1973  United Kingdom .

OTHER PUBLICATIONS

"The Compounding & Vulcanization of Rubber—Chemical Plasticizers", pp. 41, 50–52–58; Rubber Tech., 1987 ed. Maurice Morton, Sponsored by the Rubber Division of the American Chemical Society.

"Non–Black Fillers, pp. 86–104, Rubber Technology, 1987 ed. M. Morton."

*Primary Examiner*—John Kight, III
*Assistant Examiner*—P. Hampton-Hightower
*Attorney, Agent, or Firm*—Stevens, Davis, Miller & Mosher

[57] ABSTRACT

A nontacky, shock absorbing rubber composition suitable for replacing the natural clay used in horseshoe pits to absorb the energy of a thrown horseshoe, said composition comprising butyl rubber, crosslinked butyl rubber, cellulose fibre, particulate filler and plasticizer.

7 Claims, No Drawings

SYNTHETIC CLAY

Field of the Invention

The present invention relates to rubber compositions comprising butyl rubber, crosslinked butyl rubber, filler and plasticizer which exhibit minimal rebound after deformation and do not adhere to metal. The rubber compositions of the present invention are particularly suited to replacing the natural clay used in horseshoe pits to absorb the energy associated with stopping a thrown horseshoe.

BACKGROUND OF THE INVENTION

Horseshoe pitching is a well known recreational activity in which people of all ages can participate. The game involves pitching a metal horseshoe weighing less than 25 pounds a distance of 40 feet toward a peg centered in a clay pit termed a horseshoe court. The object of the game is to ring the peg with the horseshoe and failing that, to pitch the horseshoe as close as possible to the peg, the winner of the game being the competitor who succeeds in pitching the most ringers.

The natural clay used in the horseshoe court to absorb the energy of the thrown horseshoe has several disadvantages. One of these is that the clay often fragments upon impact of the horseshoe resulting in a dirty horseshoe, arena and participants. This means that as a recreational activity horseshoe pitching is effectively restricted to open spaces outdoors, clay scattered in all directions not being desirable indoors or in confined areas such as the deck of an ocean-going liner. Another disadvantage is that as horseshoe pitching is practiced primarily in the warm climates of the Midwest and California, the clay loses its moisture content and becomes harder, thereby losing its capacity to absorb energy. Consequently, it would be beneficial if the natural clay was replaced with a synthetic material that is shock absorbing, is cohesive and does not adhere to metal; properties that do not change on exposure to the atmosphere over a period of time.

DESCRIPTION OF THE PRIOR ART

Butyl polymers have been known and commercially available for many years. They possess a variety of inherently satisfactory properties amongst which are their low rebound resilience and resistance to aging, weathering, ozone and radiation. These properties make them particularly well suited for use in a variety of applications including use in caulking compounds and sealing adhesives. U.S. Pat. No. 3,945,975 for example, discloses adhesive and sealant compositions comprising a mixture of an isobutylene/divinyl aromatic copolymer and another isobutylene based elastomer, about ¾ to about 2 ½ parts by weight non-volatile plasticizer per 1 part by weight of total of said elastomers and about 0.3 to about 2 ½ parts by weight finely divided solids per 1 part by weight of total of said elastomers. This patent teaches form-retaining compositions but does not teach the energy absorbing, non-metal adhering characteristics of the compositions of the present invention.

Form-holding elastomeric compositions useful for the installation of automobile windshields are disclosed in British patent No. 1,321,815. The compositions comprise a non-curing mixture of elastomers, one or more of which is an isobutylene- based elastomer, up to 0.2 part by weight non-volatile plasticizer per 1 part by weight of elastomer, from 0.02 to 0.25 part by weight volatile plasticizer per 1 part by weight of elastomer and at least 0.9 part by weight finely divided solid per 1 part by weight of elastomer. The compositions become harder with volatilization of the volatile plasticizer, a typical composition attaining Shore A hardness of about 40 after 30 days at room temperature. The compositions of the present invention do not contain a volatile component, do not harden after time and are not form-retaining adherent mixtures.

An architectural mounting combination comprising a panel within a frame, resilient elements interposed between the frame and panel and a soft, tacky, self-supporting sealing tape is disclosed in U.S. Pat. No. 3,500,603. The tape comprises resilient elastomer having a Mooney value of at least 45, at least 100 parts of plasticizing oil per 100 parts of elastomer and at least 100 parts of particulate filler per 100 parts of elastomer to provide a 00 gauge Shore hardness of from about 40 to 45. This patent does not suggest the compositions of the present invention which do not adhere to metal (i.e. are not tacky) and are suitable as a replacement for the natural clay used in horseshoe pits.

SUMMARY OF THE INVENTION

It is an object of the present invention to provide novel rubber compositions that are particularly suitable as a replacement for the natural clay used in horseshoe pits to absorb the energy associated with stopping a thrown horseshoe. Specifically the present invention is directed towards providing rubber compositions which exhibit minimal rebound after deformation, are cohesive and do not adhere to a metal horseshoe even when the horseshoe becomes embedded upon impact. These diverse properties in proper balance are obtained in the invention by the selection of materials and proportions as will be explained hereinafter.

In one embodiment of the present invention there is provided a nontacky, shock absorbing rubber composition suitable as a replacement for natural clay in horseshoe pits comprising:

(i) about 70 to about 99 parts by weight of a butyl rubber with a Mooney viscosity (ML 1+8 at 125° C.) of from about 40 to about 60, (ii) about 1 to about 30 parts by weight of a crosslinked butyl rubber having a solubility of from about 15 weight percent to about 30 weight percent in cyclohexane, for a total of 100 parts by weight of (i) and (ii), (iii) about 20 to about 40 parts by weight per 100 parts by weight of the total of (i) and (ii) of cellulose fibre having an oil absorption of between 600 and 900 percent, (iv) about 500 to about 1200 parts by weight per 100 parts by weight of the total of (i) and (ii) of particulate filler selected from the group consisting of hydrated silica, talc, calcium carbonate, and mixtures thereof, (v) and about 280 to about 800 parts by weight per 100 parts by weight of the total of (i) and (ii) of plasticizer selected from the group consisting of low molecular weight polybutenes, naphthenic, paraffinic and aromatic processing oils, epoxidized soyabean oil, and mixtures thereof.

The present invention also provides a process for producing a nontacky, shock absorbing rubber composition suitable as a replacement for natural clay in horseshoe pits comprising the steps of:

(I) admixing under low shear in an internal mixer (a) about 20 to about 40 parts by weight per 100 parts by weight of the total of the rubbers hereinafter described of cellulose fibre having an oil absorption of between 600 and 900 percent, (b) about 330 to about 800 parts by weight per 100 parts by weight of the total of the rubbers hereinafter described of particulate filler selected from the group consisting of hydrated silica, talc, calcium carbonate, and mixtures thereof, (c) and about 56 to about 160 parts by weight of the total of the rubbers hereinafter described of plasticizer selected from the group consisting of low molecular weight polybutenes, naphthenic, paraffinic and aromatic processing oils, epoxidized soyabean oil, and mixtures thereof, (II) blending in the blend obtained in step (I)

(d) about 70 to about 99 parts by weight of a butyl rubber with a Mooney viscosity (ML 1+8 at 125° C.) of from about 40 to about 60, (e) and about 1 to about 30 parts by weight of a cross-linked butyl rubber having a solubility from about 15 weight percent to about 30 weight percent in cyclohexane, for a total of 100 parts by weight of (d) and (e), (III) blending in the blend obtained in step (II)

(f) about 170 to about 400 parts by weight per 100 parts by weight of the total of (d) and (e) of particulate filler selected from the group consisting of hydrated silica, talc, calcium carbonate, and mixtures thereof, (g) and about 224 to about 640 parts by weight of the total of (d) and (e) of plasticizer selected from the group consisting of low molecular weight polybutenes, naphthenic, paraffinic and aromatic processing oils, epoxidized soyabean oil, and mixtures thereof, said mixing being at a temperature of about 25° C. to about 70° C. for sufficient time to obtain a uniform mixture.

The present invention also provides a masterbatch of certain components of the composition comprising:

(i) about 70 to about 99 parts by weight of a butyl rubber with a Mooney viscosity (ML 1+8 at 125° C.) of from about 40 to about 60, (ii) about 1 to about 30 parts by weight of a crosslinked butyl rubber having a solubility of from about 15 weight percent to about 30 weight percent in cyclohexane, for a total of 100 parts by weight of (i) and (ii), (iii) about 20 to about 40 parts by weight per 100 parts by weight of the total of (i) and (ii) of cellulose fibre having an oil absorption of between 600 and 900 percent, (iv) about 50 to about 250 parts by weight per 100 parts by weight of the total of (i) and (ii) of particulate filler selected from the group consisting of hydrated silica, talc, calcium carbonate, and mixtures thereof, (v) about 5 to about 40 parts by weight per 100 parts by weight of the total of (i) and (ii) of plasticizer selected from the group consisting of low molecular weight polybutenes, naphthenic, paraffinic and aromatic processing oils, epoxidized soyabean oil, and mixtures thereof.

DETAILED DESCRIPTION OF THE INVENTION

Compositions described herein according to the present invention have been found to exhibit minimal rebound on deformation, to be cohesive and not adhere to metal thereby rendering the compositions of the present invention particularly suitable as a replacement for the natural clay used in horseshoe pits to absorb the energy associated with stopping a thrown horseshoe.

Butyl rubber is an essential ingredient of the present compositions and is used in an amount of from about 70 to about 99, preferably from about 80 to about 90, parts by weight based on a total of 100 parts by weight of rubbers. Butyl rubber is a copolymer of a C4–C6 isoolefin, preferably isobutylene, and a C4–C6 conjugated diolefin, preferably isoprene. A preferred butyl polymer contains from about 98 to about 99 mole percent of isobutylene and from about 1 to about 2 mole percent of isoprene and has a Mooney viscosity (ML 1 +8 at 125° C.) of from about 45 to about 60.

Crosslinked butyl rubber is another essential ingredient of the compositions of the present invention and is used in an amount of from about 1 to about 30, preferably from about 10 to about 20, parts by weight based on a total of 100 parts by weight of rubbers. Crosslinked butyl rubber is a copolymer of a C4–C6 isoolefin, preferably isobutylene, a C4–C6 conjugated diolefin, preferably isoprene, and a C10–C14 divinyl aromatic compound, preferably divinylbenzene. A preferred crosslinked butyl rubber which has a solubility in cyclohexane of from about 15 weight percent to about 30 weight percent contains from about 92 to about 95 mole percent of isobutylene, from about 1 to about 2 mole percent of isoprene and from about 4 to about 6 mole percent of a mixture comprising from about 50 to about 60 mole percent of divinylbenzene and from about 40 to about 50 mole percent of ethylvinylbenzene. While not wishing to be bound by any theories it is believed that the crosslinked butyl rubber assists with the incorporation of the large amounts of plasticizer and filler that are required in order to achieve the proper balance of shock absorption, cohesiveness and nonadherence to metal.

A further essential ingredient of the compositions of the present invention, in addition to the butyl rubber and crosslinked butyl rubber, is a considerable amount of one or more plasticizer. The proportion of plasticizer is used in an amount from about 280 to about 800 parts by weight per 100 parts by weight of the total of the rubbers and the particular proportion chosen depends, among other factors, on the nature of the plasticizer and the amount of cellulose fibre and particulate filler needed to produce the desired properties of minimum rebound upon deformation, cohesiveness and nonadherence to metal. The plasticizer may be selected from the relatively large group of commercially available materials including low molecular weight polybutenes, processing oils, epoxidized soyabean oil and mixtures thereof. Low molecular weight polybutenes are suitable as plasticizer and polybutenes such as Indopol®H-1900 having a viscosity in the range of 4,000 to 4,450 cSt at 99° C. are preferred. Processing oils of the paraffinic, naphthenic and aromatic type, preferably the paraffinic and naphthenic type, may be used as plasticizers and those which are preferred have a viscosity in the range of 7.25 to 12.95 cSt at 99° C. An example of such a processing oil which may be used with, or instead of, the low molecular weight polybutenes is Sunpar®150. Epoxidized soyabean oil is also suitable for use as a plasticizer and a preferred example is Paraplex®G-62 which has an oxirane content of about 7 percent. It is particularly preferred to use a mixture of 3 plasticizers comprising about 35 to about 100 parts by weight of low molecular weight polybutene, especially Indopol®H-1900, about 65 to about 170 parts by weight of paraffinic or naphthenic oil, especially a paraffinic oil Sunpar®150 and about 180 to about 460 parts by weight of epoxidized soyabean oil, especially Paraplex®G-62 per 100 parts by weight of the total of the rubbers.

Fibrous filler which is an essential ingredient of the compositions of the present invention provides reinforcement and absorbs a large quantity of the plasticizer. Examples of suitable fibrous filler include cellulose, fibrous talc and asbestos. However cellulose fibre is the fibre of choice in view of its outstanding ability to absorb large amounts of viscous fluid thereby increasing the viscosity of the composition in addition to providing reinforcement. A cellulose fibre such as CF FIBERS®32500-L having an oil absorption of between 600 and 900 percent used in the amount from about 20 to about 40 parts by weight per 100 parts by weight of the total of the rubbers is preferred.

High levels of particulate filler are also an essential ingredient of the present invention in order that the appropriate balance of nontackiness, minimum rebound on deformation and limited cold flow is obtained. Compositions include from about 500 to about 1200 parts by weight of particulate filler per 100 parts by weight of the total of the rubbers, the particular proportion selected depending on the nature of the filler and on the nature and type of plasticizer used. Particle diameter and surface area can vary over a wide range. Particles which have a median diameter greater than about 25 microns provide relatively little strength to the compositions while particles which have a median diameter of about 2 to 6 microns impart a high degree of stiffness. Suitable examples of particulate fillers include hydrated silicas such as Hi Sil®233, talcs such as Beaverwhite®200 and calcium carbonates such as Atomite® Mixtures of two or more particulate fillers may be employed. It is preferred to employ as particulate filler a mixture comprising talc of median particle diameter about 10 microns in the amount from about 250 to about 600 parts by weight and talc of median particle diameter about 6 microns in the amount from about 250 to about 600 parts by weight per 100 parts by weight of the total of the rubbers.

The compositions of the present invention may contain other ingredients known as processing aids which permit the rapid incorporation of filler into the rubbers. Suitable examples include salts of fatty acids such as calcium stearate and vulcanized vegetable oils such as Neophax®A. It is preferred to use the vulcanized vegetable oil Neophax®A in the amount from about 20 to about 30 parts by weight per 100 parts by weight of the total of the rubbers.

In addition to the butyl rubber, the crosslinked butyl rubber, the plasticizer, the cellulose fibre, the particulate filler and the processing aid described above, the composition may further comprise one or more U.V. stabilizers such as Tinuvin®327 and one or more antioxidants such as Irganox®1010, all of which additional components are well known to those skilled in the rubber art.

In preparing the compositions of the present invention all the ingredients may be blended under low shear in a mixing device such as a double arm Baker Perkins mixer equipped with dispersion blades. Typically such blending involves charging the mixer at an initial temperature of about 25° C. with the cellulose fibre, about two-thirds of the filler, about one-fifth of the plasticizer, the processing aid, U.V. stabilizer and antioxidant. After about 2 minutes of mixing, the butyl rubbers are then added. Mixing is continued for about 8 minutes and then the remainder of the filler and the plasticizer are added slowly over about 30 minutes during which time the mixture attains a temperature of about 70° C. The resultant homogeneous mass is then dumped.

Masterbatches of certain components of the compositions may be prepared in an internal mixing device such as a Banbury. The mixer, at an internal temperature of about 25° C., is charged with the butyl rubbers, cellulose fibre, about 2 to about 5 percent of the plasticizer, about 10 to about 20 percent of the filler, the U.V. stabilizer and the antioxidant. After mixing for about 6 minutes at 20 rpm, when the masterbatch has attained a temperature of about 120° C., it is dumped. The masterbatches may then be mixed with the remainder of the filler and the plasticizer under low shear in a Baker Perkins mixer using the following procedure. The mixer at an initial temperature of about 25° C., is charged with about 20 to about 25 percent of the plasticizer and about 50 to about 60 percent of the filler. After about 2 minutes of mixing, the masterbatch is added. Mixing is continued for about 5 to about 10 minutes and then the remainder of the plasticizer and the filler are added slowly over about 30 minutes. The resultant homogeneous mass which has attained a temperature of about 70° C. is then dumped.

In order to be a satisfactory replacement for the natural clay presently used in horseshoe pits, the rubber composition should be cohesive and not adhere to the metal horseshoe even after being exposed to hot summer temperatures for a prolonged period of time. In a peel test where the rubber composition is pressed against a flat metal surface, adhesive failure rather than cohesive failure should occur. After aging the sample for three days in a hot air oven at 70° C. and then cooling it and subsequently subjecting it to the peel test, failure should occur entirely in adhesion and not in cohesion.

Furthermore, the rubber composition should be capable of absorbing the energy of a thrown horseshoe with minimal rebound of the horseshoe; this can be tested in the laboratory by determining the amount of rebound when a stainless steel ball weighing 50 grams is dropped into a block of the material.

The present invention is further illustrated by the following non-limiting examples in which all parts and percentages are by weight unless otherwise indicated and temperatures are in ° C.

EXAMPLE

A series of rubber compositions suitable as a replacement for natural clay presently used in horseshoe pits were prepared using the following procedure. Masterbatches were first prepared according to the recipes shown in Table 1.

TABLE I

|  | Run No. | | | | |
| --- | --- | --- | --- | --- | --- |
|  | 1 | 2 | 3 | 4 | 5 |
| POLYSAR ® Butyl 301 | 80 | 80 | 85 | 85 | 85 |
| POLYSAR ® Butyl XL-20 | 20 | 20 | 15 | 15 | 15 |
| Beaverwhite ® 325 | 75 | 75 | 75 | 75 | 75 |
| Beaverwhite ® 200 | 75 | 75 | 75 | 75 | 75 |
| CF FIBERS ® 32500-L | 25 | 25 | 25 | 35 | 25 |
| Neophax ® A | 25 | 25 | 25 | 25 | 25 |
| Calcium Stearate | — | — | — | — | 2.5 |
| Sunpar ® 150 | 10 | 10 | 10 | 10 | 10 |
| Irganox ® 1010 | 1.2 | 1.2 | 1.2 | 1.2 | 1.2 |
| Tinuvin ® 327 | 2.1 | 2.1 | 2.1 | 2.1 | 2.1 |

The POLYSAR® Butyl 310, POLYSAR® Butyl XL-20, Beaverwhite®200, Beaverwhite®325, Neophax®A, the celluose fibre CF FIBERS®32500-L, calcium stearate, Sunpar®150, an antioxidant Irganox®1010 and a U.V. stabilizer Tinuvin®327 were introduced into the mixing chamber of a Banbury mixer at an internal temperature of 27° C. Mixing was carried out for 2 minutes at 20rpm at the end of which time mixing was stopped and the ram floated and swept. After the mixing and sweeping cycle had been repeated mixing was continued for an additional 2 minutes or until the internal temperature of the mixing chamber had reached 121° C. (whichever was attained first). The compounds were dumped and calendered into sheets using a two roll calender with the rolls at ambient temperature.

The masterbatches were further mixed with Beaverwhite®200, Beaverwhite®325, Indopol®H-1900, Sunpar®150 and Paraplex®G-62 according to the recipes shown in Table II in a double arm Baker Perkins mixer equipped with dispersion blades to yield compositions according to the invention.

TABLE II

|  | Run No. | | | | |
|---|---|---|---|---|---|
|  | 1 | 2 | 3 | 4 | 5 |
| Beaverwhite® 200 | 225 | 225 | 225 | 225 | 450 |
| Beaverwhite® 325 | 225 | 225 | 225 | 225 | 450 |
| Indopol® H-1900 | 45 | 45 | 45 | 45 | 80 |
| Sunpar® 150 | 67 | 67 | 67 | 67 | 130 |
| Paraplex® G-62 | 200 | 300 | 200 | 200 | 410 |

The static peel adhesion, rebound characteristics and softness of the rubber compositions were tested using the following procedures with the results shown in Table III.

The static peel adhesion was determined by applying a 2.5 mm thick layer of the rubber composition backed with a layer of fabric to a 3 inch x 10 inch sheet of aluminum with 5 lbs. pressure for 15 seconds. The force per unit width required to pull the rubber composition apart from the aluminum sheet was then measured. Any residue adhering to the surface of the aluminum sheet was noted.

The rebound characteristics were determined by dropping a stainless steel ball weighing 50 grams from a height of 3 feet into a 1 pound block of the material and measuring the amount of rebound.

The softness of a 0.75 inch thick sample of the rubber composition was determined using a cone penetrometer bearing a 150 gram load. Penetration was permitted for 5 seconds and the depth of penetration was then determined.

The rubber compositions were aged in a hot air oven for 3 days at 70° C. and then the static peel adhesion, rebound characteristics and softness of each composition were redetermined using the same procedures, the results being shown in Table III..

TABLE III

| Run No. | Static Peel Adhesion (lbs. per square inch) | | Rebound (inches) | | Softness (mm) | |
|---|---|---|---|---|---|---|
|  | unaged | aged | unaged | aged | unaged | aged |
| 1 | 0.125 no residue on aluminum | 1 no residue on aluminum | 0 | 0 | 6 | 4 |
| 2 | 0.125 no residue on | 0.125 no residue on | 0 | 0 | 12 | 8 |
| 3 | aluminum 0.25 no residue on aluminum | aluminum 0.25 no residue on aluminum | 0 | 0 | 7 | 5 |
| 4 | 0.125 no residue on aluminum | 0.25 no residue on aluminum | 0 | 0 | 7 | 5 |
| 5 | 0.25 no residue on aluminum | 0.25 no residue on aluminum | 0 | 0 | 15 | 15 |

Practical tests in horseshoe competitions clearly showed that compositions according to the invention functioned very well and experts considered the composition to be an excellent product having better properties than the clay material normally used.

What is claimed is:

1. A nontacky, shock absorbing rubber composition suitable as a replacement for natural clay in horseshoe pits comprising:
    (i) about 70 to about 99 parts by weight of a butyl rubber with a Mooney viscosity (ML +8 at 125° C.) of from about 40 to about 60,
    (ii) about 1 to about 30 parts by weight of a crosslinked butyl rubber having a solubility from about 15 weight percent to about 30 weight percent in cyclohexane, for a total of 100 parts by weight of (i) and (ii),
    (iii) about 20 to about 40 parts by weight per 100 parts by weight of the total of (i) and (ii) of cellulose fibre having an oil absorption of between 600 and 900 percent,
    (iv) about 500 to about 1200 parts by weight per 100 parts by weight of the total of (i) and (ii) of particulate filler selected from the group consisting of hydrated silica, talc, calcium carbonate, and mixtures thereof,
    (v) and about 280 to about 800 parts by weight per 100 parts by weight of the total of (i) and (ii) of plasticizer selected from the group consisting of low molecular polybutenes, naphthenic, paraffinic and aromatic processing oils, epoxidized soyabean oil, and mixtures thereof.

2. A rubber composition according to claim 1 which also comprises vulcanized vegetable oil, one or more U.V. stabilizer and one or more antioxidant.

3. A rubber composition according to claim 1 wherein said butyl rubber has an isobutylene content from about 98 mole percent to about 99 mole percent and an isoprene content from about 1 mole percent to about 2 mole percent.

4. A rubber composition according to claim 1 wherein said particulate filler comprises:
    about 250 to about 600 parts by weight talc of median particle diameter about 10 microns and about 250 to about 600 parts by weight talc of median particle diameter about 6 microns.

5. A rubber composition according to claim 1 wherein said plasticizer comprises:
    (a) about 35 to about 100 parts by weight low molecular weight polybutenes having a viscosity of about 4,000 to about 4,450 cSt at 99° C.

(b) about 65 to about 170 parts by weight paraffinic oil having a viscosity of about 7.25 to about 12.95 cSt at 99° C.

(c) and about 180 to about 460 parts by weight epoxidized soyabean oil having an oxirane content of about 7 percent.

6. A nontacky, shock absorbing rubber composition suitable as a replacement for natural clay in horseshoe pits comprising:

(i) about 70 to about 99 parts by weight of a butyl rubber with an isobutylene content from about 98 mole percent to about 99 mole percent and a isoprene content from about 1 mole percent to about 2 mole percent, (ii) about 1 to about 30 parts by weight of a crosslinked butyl rubber having a solubility from about 15 weight percent to about 30 weight percent in cyclohexane, for a total of 100 parts by weight of (i) and (ii), (iii) about 20 to about 40 parts by weight per 100 parts by weight of the total of (i) and (ii) of cellulose fibre having a oil absorption of between 600 and 900 percent, (iv) about 500 to about 1200 parts by weight per 100 parts by weight of the total of (i) and (ii) of particulate filler comprising: about 250 to about 600 parts by weight talc of median particle diameter about 10 microns and about 250 to about 600 parts by weight talc of median particle diameter about 6 microns, (v) and about 280 to about 800 parts by weight per 100 parts by weight of the total of (i) and (ii) of plasticizer comprising:

(a) about 35 to about 100 parts by weight low molecular weight polybutenes having a viscosity of about 4,000 to about 4,450 cSt at 99° C.

(b) about 65 to about 170 parts by weight paraffinic oil having a viscosity of about 7.25 to about 12.95 cSt at 99° C.

(c) and about 180 to about 460 parts by weight epoxidized soyabean oil having an oxirane content of about 7 percent, and vulcanized vegetable oil, U.V. stabilizer and antioxidant.

7. A process for producing a nontacky, shock absorbing rubber composition suitable as a replacement for natural clay in horseshoe pits comprising the steps of:

(I) admixing under low shear in an internal mixer (a) about 20 to about 40 parts by weight per 100 parts by weight of the total of the rubbers hereinafter described of cellulose fibre having an oil absorption of between 600 and 900 percent, (b) about 330 to about 800 parts by weight per 100 parts by weight of the total of the rubbers hereinafter described of particulate filler selected from the group consisting of hydrated silica, talc, calcium carbonate, and mixtures thereof, (c) and about 56 to about 160 parts by weight of the total of the rubbers hereinafter described of plasticizer selected from the group consisting of low molecular weight polybutenes, naphthenic, paraffinic and aromatic processing oils, epoxidized soyabean oil, and mixtures thereof, (II) blending in the blend obtained in step (I)

(d) about 70 to about 99 parts by weight of a butyl rubber with a Mooney viscosity (ML 1+8 at 125° C.) of from about 40 to about 60, (e) and about 1 to about 30 parts by weight of a crosslinked butyl rubber having a solubility from about 15 weight percent to about 30 weight percent in cyclohexane, for a total of 100 parts by weight of (d) and (e), (III) blending in the blend obtained in step (II)

(f) about 170 to about 400 parts by weight per 100 parts by weight of the total of (d) and (e) of particulate filler selected from the group consisting of hydrated silica, talc, calcium carbonate, and mixtures thereof, (g) and about 224 to about 640 parts by weight of the total of (d) and (e) of plasticizer selected from the group consisting of low molecular weight polybutenes, naphthenic, paraffinic and aromatic processing oils, epoxidized soyabean oil, and mixtures thereof, said mixing being at a temperature of about 25 to about 70° C. for sufficient time to obtain a uniform mixture.

* * * * *